US009910464B2

United States Patent
Lyles et al.

(10) Patent No.: US 9,910,464 B2
(45) Date of Patent: Mar. 6, 2018

(54) MAGNETIC SIMULATED HINGE FOR ATTACHING A TABLET COMPUTER TO A BASE

(71) Applicant: Dell Products, LP, Round Rock, TX (US)

(72) Inventors: Justin C. Lyles, San Diego, CA (US); Brian H. Leonard, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 88 days.

(21) Appl. No.: 14/460,961

(22) Filed: Aug. 15, 2014

(65) Prior Publication Data
US 2016/0048173 A1 Feb. 18, 2016

(51) Int. Cl.
*G06F 1/16* (2006.01)
*G06F 3/02* (2006.01)

(52) U.S. Cl.
CPC .......... *G06F 1/1681* (2013.01); *G06F 1/1626* (2013.01); *G06F 1/1632* (2013.01); *G06F 1/1656* (2013.01); *G06F 1/1669* (2013.01); *G06F 1/1679* (2013.01); *G06F 3/0202* (2013.01); *G06F 2200/1634* (2013.01)

(58) Field of Classification Search
CPC ..... G06F 1/1681; G06F 1/1632; G06F 1/1656
USPC ........................... 361/679.01, 679.17, 679.09
See application file for complete search history.

(56) References Cited

U.S. PATENT DOCUMENTS

| 6,870,732 | B2 * | 3/2005 | Huang | G06F 1/1626 220/230 |
| 8,599,542 | B1 * | 12/2013 | Healey | G06F 1/1626 345/168 |
| 2009/0029741 | A1 * | 1/2009 | Satou | H01Q 1/243 455/566 |
| 2010/0238620 | A1 * | 9/2010 | Fish | G06F 1/1616 361/679.09 |
| 2012/0066424 | A1 | 3/2012 | Gentil | |

(Continued)

OTHER PUBLICATIONS

"Toshiba Satellite Click 2 L30W-BST2N23," Toshiba America Information Systems, Aug. 15, 2014, pp. 1-2, http://www.toshiba.com/us/computers/laptops/satellite/Click2/L30W-BST2N23.

(Continued)

*Primary Examiner* — Tuan T Dinh
*Assistant Examiner* — Rockshana Chowdhury
(74) *Attorney, Agent, or Firm* — Larson Newman, LLP (57) ABSTRACT

An information handling system includes a tablet computer and a base. The tablet computer includes a first plurality of closing magnets, first and second holding magnets, and a rounded edge. The base includes a hinge area, a second plurality of closing magnets, and third and fourth holding magnets located a bottom portion of the hinge area. The hinge area receives the tablet computer when the tablet computer is rotated from a closed position to an opened position, and holds the tablet computer in the opened position. The second closing magnets align with the first closing magnets, align the tablet computer on the base, and hold the tablet computer in the closed position. The third and fourth holding magnets attract the first and second holding magnets to ensure an alignment of the tablet computer within the base when the tablet computer is rotated from the closed position to the opened position.

20 Claims, 5 Drawing Sheets

(56) References Cited

U.S. PATENT DOCUMENTS

2012/0243149 A1* 9/2012 Gartrell ................ G06F 1/1616
361/679.01
2013/0279096 A1* 10/2013 Gengler ................... H05K 7/00
361/679.01

OTHER PUBLICATIONS

"ASUS Transformer Book T100 Convertible Notebook Tablet, Specs & More," ASUS TeK Computer, Inc., Aug. 15, 2014, pp. 1-7, http://www.asus.com/in-search-of-incredible/us-en/asus-transformer-book-t100/.
"Lenovo Miix 2 8" Tablet with 2-in-1 Wide-View Display, Lenovo, Aug. 15, 2014, pp. 1-2, http://shop.lenovo.com/us/en/tablets/ideatab/miix-series/miix-2/#.
"HP Split 13-r010dx x2 Detachable PC," Hewlett-Packard Company, LP, Aug. 5, 2014, pp. 1-2, http://www.shopping.hp.com/en_US/home-office/-/products/Laptops/HP-Split/G6Q88UA?HP-Split-13-r010dx-x2-Detachable-PC.
"Samsung ATIV Smart PC Pro 700T (700T1C)," Samsung Electronics, Aug. 15, 2014, p. 1-5, http://www.samsung.com/us/computer/pcs/XE700T1C-A03US.
"Archos 101 XS2, Tablets Overview," Archos, Aug. 15, 2014, p. 1-6, http://www.archos.com/us/products/gen11/archos_101xs2/index.html.

* cited by examiner

MAGNETIC SIMULATED HINGE FOR ATTACHING A TABLET COMPUTER TO A BASE

FIELD OF THE DISCLOSURE

The present disclosure generally relates to a magnetic simulated hinge for attaching a tablet computer to a base.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Portable information handling systems, such as tablet computers, may not come with a physical keyboard but may include a virtual keyboard on the display screen of the tablet computer. However, the tablet computer may be wirelessly paired with a physical keyboard and may be mountable to the physical keyboard.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIGS. 1-6 show an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
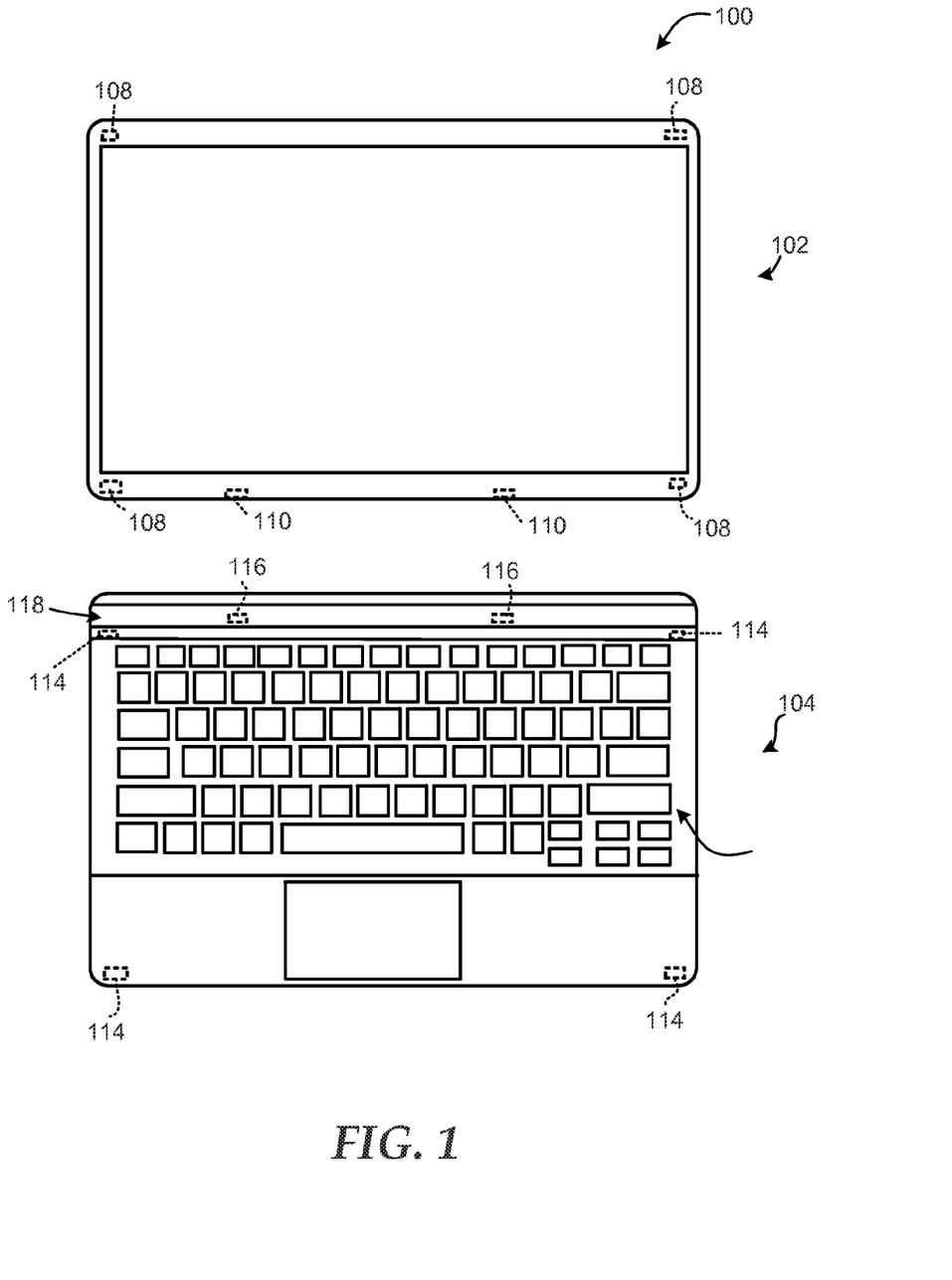
FIG. 1 is a diagram of an information handling system including a tablet computer and a base.
Figure 2:
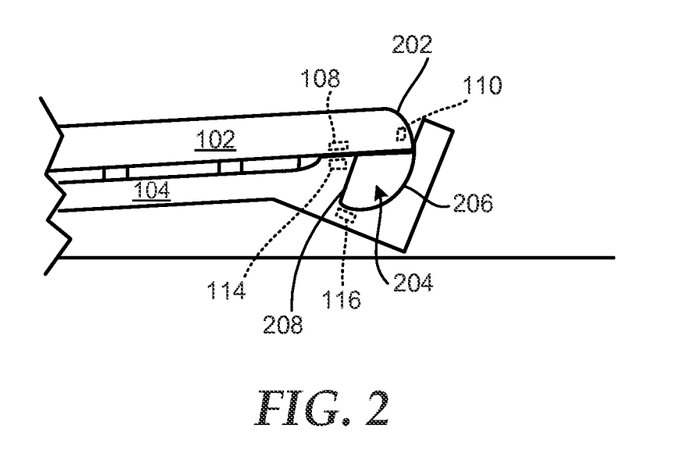
FIGS. 2-6 are diagrams of the tablet computer and the base in different stages of rotation of the tablet computer between a closed position and an opened position.

The information handling system 100 includes a tablet computer 102 and a base 104. The tablet computer 102 includes a display screen 106, closing magnets 108, and holding magnets 110. In an embodiment, a different one of the closing magnets 108 can be located at each corner of the display screen 106, and the holding magnets 110 can be located along a bottom edge of the tablet computer as shown in FIGS. 1 and 2. The distance that each holding magnet 110 is from its corresponding side of the tablet computer 102 and a distance between the holding magnets can be set so that the tablet computer does not lean to one side or the other when rotating from a closed position to an opened position, as discussed in greater detail below.

The base 104 includes a keyboard 112, closing magnets 114, holding magnets 116, and a hinge area 118. In an embodiment, two of the closing magnets 114 are located in between the keyboard 112 and the hinge area 118, and the other two closing magnets are located an the opposite end of a keyboard surface of the base 104. The holding magnets 116 of the base are located in the bottom of the hinge area 118 as shown in FIG. 2. In an embodiment, each of the closing magnets 108 of the tablet computer 102 has a corresponding closing magnet 114 in the base 104. Similarly, each of the holding magnets 110 of the tablet computer 102 has a corresponding holding magnet 116 of the base of 104. In an embodiment, the hinge area 118 extends the entire length of the base 104, such as along the top of the keyboard 112, as shown in FIG. 1. However in another embodiment, the hinge area 118 can extend only a portion of the base 104, such that the hinge area only extends a predetermined length of the base. For example, the predetermined length of the hinge area 118 can be determined in response to the locations that the holding magnets 110 are located in the tablet computer 102 so that the corresponding holding magnets 116 can be located within the hinge area 118 of the base 104. When the tablet computer 102 is in the closed position on base 104 each of the closing magnets 108 of the tablet computer can be located directly above a corresponding closing magnet 110 of the base 104.

FIG. 2 shows a portion of the tablet computer 102 in the closed position on the base 104. The tablet computer 102 includes a rounded edge 202 at the intersection of a hack surface and a bottom edge of the tablet computer. The hinge area 118 of the base 104 includes a hinge cavity 204, which in turn includes a curved portion 206 and a straight stop edge 208. When the tablet computer 102 is in the closed position the tablet computer is placed on top of the base 104 with the display screen 106 facing downward onto keyboard. 112 of the base. The alignment and the magnetic force of the attraction between the closing magnets 108 of the tablet computer 102 and the closing magnets 114 of the base 104 enable the tablet computer to remain securely on top of the base without sliding off. For example, the magnetic force between closing magnets 108 and 114 can provide enough force so that the tablet computer 102 will not slide off of the base 104 when the information handling system 100 is lifted up by the binge area 118 of the base 104 and turned to a vertical position. In the closed position, the bottom edge of the tablet computer 102 that includes the holding magnets 110 is placed in physical communication with the curved portion 206 of the hinge area.

Figure 3:
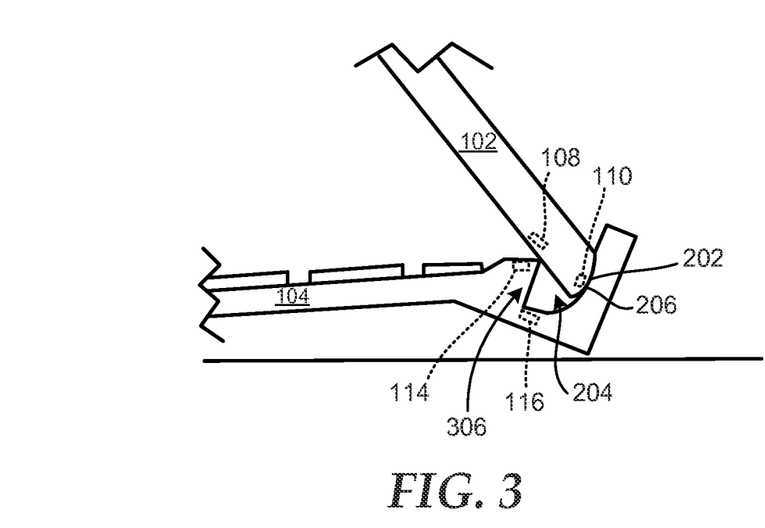
Figure 5:
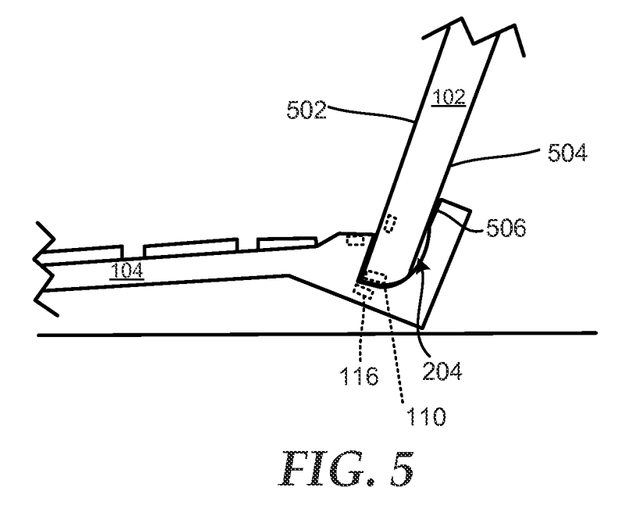
Figure 6:
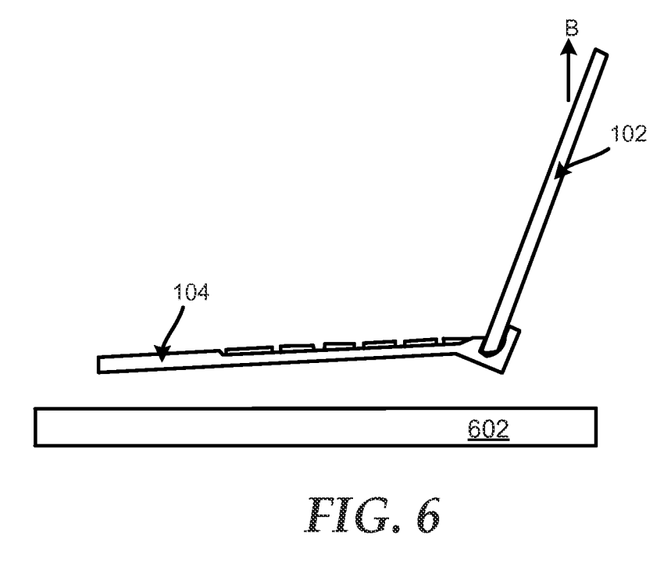

Referring now to FIG. 3, the front of the tablet computer 102 can be lifted up from the base 104, such that the bottom edge with the holding magnets 110 is rotated downward into the hinge cavity 204. In an embodiment, the base 104 can include a notch to allow a finger of a user to lift the front edge of the tablet computer 102. The lifting of the tablet computer 102 can cause the tablet computer to rotate from the closed position to an opening position, as shown in FIG. 5, and can break the magnetic attraction force between the closing magnets 108 of the tablet computer and the closing magnets 116 of the base 104. As the tablet computer 102 continues to be rotated between the closed position and the opened position, the rounded edge 202 continually slides in physical communication with the curved portion 206 of the hinge area 118.

In an embodiment, the tablet computer 102 can rotate around a rotation point 306 of the hinge area 118. The rotation of the tablet computer 102 around the rotation point 306 is caused as a result physical communication of a top of the straight stop edge 208 of the hinge cavity 204 with the tablet computer 102, the rounded edge 202 of the tablet computer sliding along the curved portion 206 of the hinge cavity, and the attractive magnetic force between the holding magnets 110 of the tablet computer and the holding magnets 116 of the base. Additionally, location of the holding magnets 110 in the tablet computer 102 and holding magnets 116 in the base 104 ensures that the tablet computer does not slide side-to-side while the base is rotated from the closed position to the opened position.

During the rotation of the tablet computer 102, the distance between the closing magnets 108 of the tablet computer and closing magnets 114 of the base 104 can be such that the closing magnets will not have an attractive force with each other, and the distance between the holding magnets 110 of the tablet computer and holding magnets 116 of the base can be such that the magnets holding will not have an attractive force with each other. In another embodiment, at this distance the closing magnets 108 of the tablet computer 102 and closing magnets 114 of the base 104 can still have an attractive force with each other, but the force can be so small that the force appears to no longer exist to a user. Similarly, at this distance the holding magnets 110 of the tablet computer and holding magnets 116 can still have an attractive force with each other, but the force can be so small that the force appears to no longer exist to a user.

Figure 4:
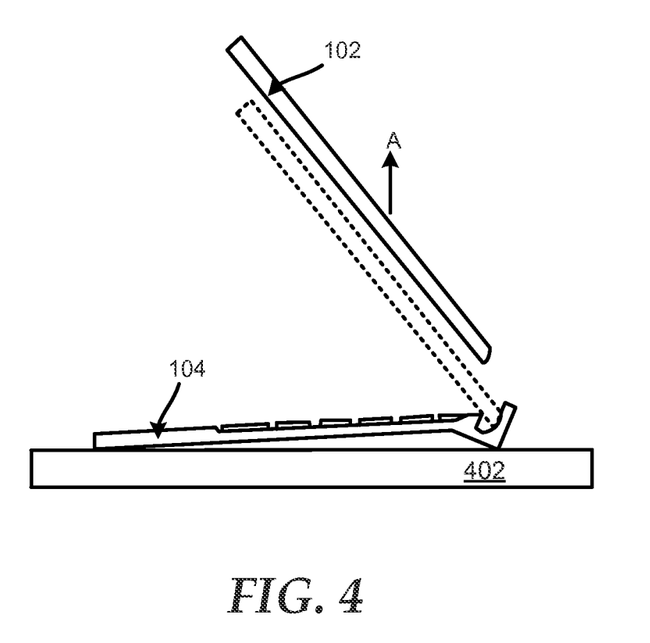

This distance between the respective magnets can occur at a predetermined angle of the tablet computer 102 with respect to the base 104, such as forty-five degrees. The user of the information handling system 100 can then easily remove the tablet computer 102 from the base 104 by lifting the tablet computer in the direction of arrow A, as shown in FIG. 4, and the base can remain stationary on a surface, such as a table 402 of FIG. 4.

Referring now to FIG. 5, a user can continue to rotate the tablet computer 102 toward the opened position, the rounded edge 202 can continue to slide along the curved portion 206 of the hinge cavity 204, and the holding magnets 110 of the tablet computer can begin to attract the holding magnets 116 of the base 104. In an embodiment, the curved surface of the rounded edge 202 can be matched to the curved surface of the curved portion 206 of the hinge cavity 204 so that the rotation of the tablet computer can have a smooth hinging 'feel' to the user of the information handling system 100. For example, the smooth hinging feel can result from the rounded edge 202 sliding along the curve portion 206 without any rough movements of the tablet computer 102, and without the user having to completely remove the tablet computer from the base 104, reposition the tablet computer in the opened position, and then placing the tablet computer back in physical communication with the base. Instead, the rounded edge 202 of the tablet computer 102 can seamlessly transition from the closed position to sliding along the curve portion 206 without the user actually feeling the any type of transition while the tablet computer is rotated from the closed position to the opened position.

When the tablet computer 102 is placed in the opened position, the holding magnets 110 of the tablet computer can be aligned with the holding magnets 116 of the base 104. In embodiment, the force of attraction between the holding magnets 110 of the tablet computer 102 and the holding magnets 116 of the base 104 is greater than the force of attraction between the closing magnets 108 of the tablet computer and the closing magnets 114 of the base. Also while the tablet computer 102 is in the opened position, the physical shapes of the tablet computer and hinge cavity 204 can create a locking action between the tablet computer and the hinge area 118. For example, the tablet computer 102 can be placed in the opened position when a front surface 502 of the tablet computer is placed in physical communication with the straight stop edge 208 of the hinge area 118, and a back surface 504 of the tablet computer is placed in physical communication with a top portion 506 of the hinge area. The locking action between the tablet computer 102 and the base 104 can then result from the user lifting up on the tablet computer and the weight of the base creating a cantilever force on the tablet computer. For example, the cantilever force on the points of contact between the front surface 502 of the tablet computer 102 and the straight stop edge 208 of the hinge area 118, and on the points of contact between the back surface 504 of the tablet computer a top portion 506 of the hinge area can prevent the tablet computer from being removed from the base 104 when the tablet computer is lifted up in the direction of arrow B in FIG. 6. In this situation, both the tablet computer 102 and the base 104 will be lifted off of a surface, such as table 602, that the base was resting on prior to the tablet computer being lifted in the direction of arrow B.

Figure 7:
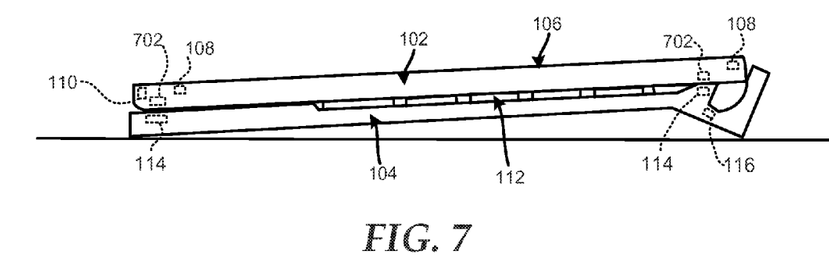
FIG. 7 is a diagram of the tablet computer in a docking position on the base.

FIG. 7 shows a diagram of the tablet computer 102 in a docking position on the base 104. In an embodiment, the tablet computer 102 includes docking magnets 702 on the back surface 506. In this embodiment, the tablet computer 102 can be placed in the docking position, such that the display screen 106 is facing upward and the back surface 506 is facing down toward the keyboard 112 of the base. The docking position can enable a user the ability to interact with the display screen 106 while the tablet computer 102 is resting on the base 102. In an embodiment, the user interacting with the display screen 106 can include interfacing with the touch capabilities of the display screen, such as typing on a virtual keyboard, selecting soft buttons or icons to launch applications, or the like. The magnetic force of the attraction between the docking magnets 702 of the tablet computer 102 and the closing magnets 114 of the base 104 enable the tablet computer to remain securely on top of the base without sliding off. For example, the magnetic force between docking magnets 702 and the closing magnets 114 can provide enough force so that the tablet computer 102 will not slide off of the base 104 when the information handling system 100 is lifted up by the hinge area 118 of the base 104 and turned to a vertical position while the tablet computer is in the docking position. As shown in FIG. 7, the holding magnet 110 is positioned near the bottom of the base 104 while the computer tablet 102 is in the docking position. Additionally, the holding magnet 110 can also be positioned near the top of the base 104 close to the hinge 118 while the computer tablet 102 is in the docking position.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a tablet computer including:
        a first plurality of closing magnets located around a display screen of the tablet computer;
        first and second holding magnets located along a first edge of the tablet computer; and
        a rounded edge between a back surface of the tablet computer and the first edge of the tablet computer; and
    a base including:
        a hinge area including a curved portion, the curved portion to be continuously placed in physical communication with the rounded edge of the tablet computer while the tablet computer is rotated from a closed position to an opened position, wherein the continuous physical communication between the rounded edge of the tablet computer and the curved portion includes the rounded edge sliding along in physical communication with the curved portion from a first location of the curved portion when the tablet computer is in the closed position to a second location of the curved portion when the tablet computer is in the opened position, and the hinge portion to hold the tablet computer in the opened position;
        a second plurality of closing magnets located within the base, the second plurality of closing magnets located between a keyboard of the base and an edge of the base adjacent to the hinge area, the second closing magnets to align with a first number of the first closing magnets, to align the tablet computer in the closed position on the base, and to hold the tablet computer in the closed position, wherein a force of attraction between the second plurality of closing magnets and the first closing magnets enables the tablet to remain securely on the base without sliding off; and
        third and fourth holding magnets located at a bottom portion of the hinge area, the third and fourth holding magnets to attract the first and second holding magnets to ensure an alignment of the tablet computer within the base while the tablet computer is rotated from the closed position to the opened position.

2. The information handling system of claim 1, wherein the tablet computer further includes:
    a plurality of docking magnets located on the back surface, the docking magnets to align with the second closing magnets, to align the tablet computer in a docking position on the base, and to hold the tablet computer in the docking position.

3. The information handling system of claim 1, wherein a cantilever force of the base enables the hinge area to lock with the tablet computer while the tablet computer is lifted in an upward direction while the tablet computer is in the opened position, wherein the locking of the tablet computer with the base enables both the tablet computer and the base to be lifted in the upward direction while the tablet computer is lifted in the opened position.

4. The information handling system of claim 1, wherein the tablet computer is easily removed from the base in response to the tablet computer being lifted upward while the tablet computer is located at predetermined angle along a rotation from the closed position to the opened position.

5. The information handling system of claim 1, wherein the hinge area extends less than an entire length of the base.

6. The information handling system of claim 1, wherein the rounded edge of the tablet computer is configured to slide along the curved portion of the hinge area while the tablet computer is rotated from the closed position to the opened position.

7. The information handling system of claim 6, wherein a curvature of the rounded edge is matched with a curvature of the curved portion to create a smooth hinging rotation of the tablet computer from the closed position to the opened position.

8. An information handling system comprising:
    a tablet computer including:
        a first plurality of closing magnets located around a display screen of the tablet computer, the first closing magnets to align with a second plurality of closing magnets located within a base, the second plurality of closing magnets located between a keyboard of the base and an edge of the base adjacent to a hinge area of the base while the tablet computer is in a closed position on the base, to align the tablet computer on a base, and to hold the tablet computer in the closed position on the base, wherein a force of attraction between the second plurality of closing magnets and the first closing magnets enables the tablet to remain securely on the base without sliding off;

first and second holding magnets located along a first edge of the tablet computer, the first and second holding magnets to ensure an alignment of the tablet computer within the base while the tablet computer is rotated from the closed position to an opened position; and a rounded edge between a back surface of the tablet computer and the first edge of the tablet computer, wherein the rounded edge is configured to be continuously placed in physical communication with a curved portion of the hinge area of the base while the tablet computer is rotated from the closed position to an opened position, wherein the continuous physical communication between the rounded edge of the tablet computer and the curved portion includes the rounded edge sliding along in physical communication with the curved portion from a first location of the curved portion when the tablet computer is in the closed position to a second location of the curved portion when the tablet computer is in the opened position.

9. The information handling system of claim 8, wherein the tablet computer further includes:

docking magnets located on the back surface, the docking magnets to align the tablet computer in a docking position on the base, and to hold the tablet computer in the docking position.

10. The information handling system of claim 8, wherein the tablet computer is held in a locked position with the base while the tablet computer is lifted in an upward direction while the tablet computer is in the opened position in response to a cantilever force of the base, wherein the locking position of the tablet computer with the base enables both the tablet computer and the base to be lifted in the upward direction while the tablet computer is lifted in the opened position.

11. The information handling system of claim 8, wherein the tablet computer is easily removed from the base in response to the tablet computer being lifted upward while the tablet computer is located at predetermined angle along a rotation from the closed position to the opened position.

12. The information handling system of claim 8, wherein the rounded edge of the tablet computer is configured to slide in physical communication with a curved portion of the hinge area while the tablet computer is rotated from the closed position to the opened position.

13. The information handling system of claim 12, wherein a curvature of the rounded edge is matched with a curvature of the curved portion to create a smooth hinging rotation of the tablet computer from the closed position to the opened position.

14. An information handling system comprising:
a base including:
a keyboard;
a hinge area located along a top edge of the keyboard, the hinge area includes a curved portion to be continuously placed in physical communication with a rounded edge of a tablet computer is rotated from a closed position to an opened position, the hinge area including a stop edge, the tablet computer to rotate around a rotation point of the hinge area in response to physical communication between the tablet computer and a top of the stop edge as the tablet computer is rotated from the closed position to the opened position, and the hinge area to hold the tablet computer in the opened position;
a plurality of closing magnets located within the base, the second plurality of closing magnets located between the keyboard of the base and an edge of the base adjacent to the hinge area, the closing magnets to align the tablet computer in the closed position on the base, and to hold the tablet computer in the closed position; and
first and second holding magnets located at a bottom portion of the hinge area, the second and third holding magnets to ensure an alignment of the tablet computer within the base while the tablet computer is rotated from the closed position to the opened position.

15. The information handling system of claim 14, wherein the closing magnets are further configured to align with magnets of the tablet computer, to align the tablet computer in a docking position on the base, and to hold the tablet computer in the docking position.

16. The information handling system of claim 14, wherein a cantilever force of the base enables the hinge area to lock with the tablet computer while the tablet computer is lifted in an upward direction while the tablet computer is in the opened position, wherein the locking of the tablet computer with the base enables both the tablet computer and the base to be lifted in the upward direction while the tablet computer is lifted in the opened position.

17. The information handling system of claim 14, wherein the tablet computer is easily removed from the base in response to the tablet computer being lifted upward while the tablet computer is located at predetermined angle along a rotation from the closed position to the opened position.

18. The information handling system of claim 14, wherein the hinge area extends less than an entire length of the base.

19. The information handling system of claim 14, wherein the rounded edge of the tablet computer is configured to slide along the curved portion of the hinge area while the tablet computer is rotated from the closed position to the opened position.

20. The information handling system of claim 19, wherein a curvature of the rounded edge is matched with a curvature of the curved portion to create a smooth hinging rotation of the tablet computer from the closed position to the opened position.

* * * * *